Nov. 11, 1952 L. BOOTH 2,617,454
ROD DISK CUTTING MACHINE
Filed July 9, 1945 5 Sheets-Sheet 2

INVENTOR.
LEON BOOTH.
BY
ATTORNEY.

Nov. 11, 1952           L. BOOTH           2,617,454

ROD DISK CUTTING MACHINE

Filed July 9, 1945           5 Sheets-Sheet 3

INVENTOR.
LEON BOOTH.

BY

ATTORNEY.

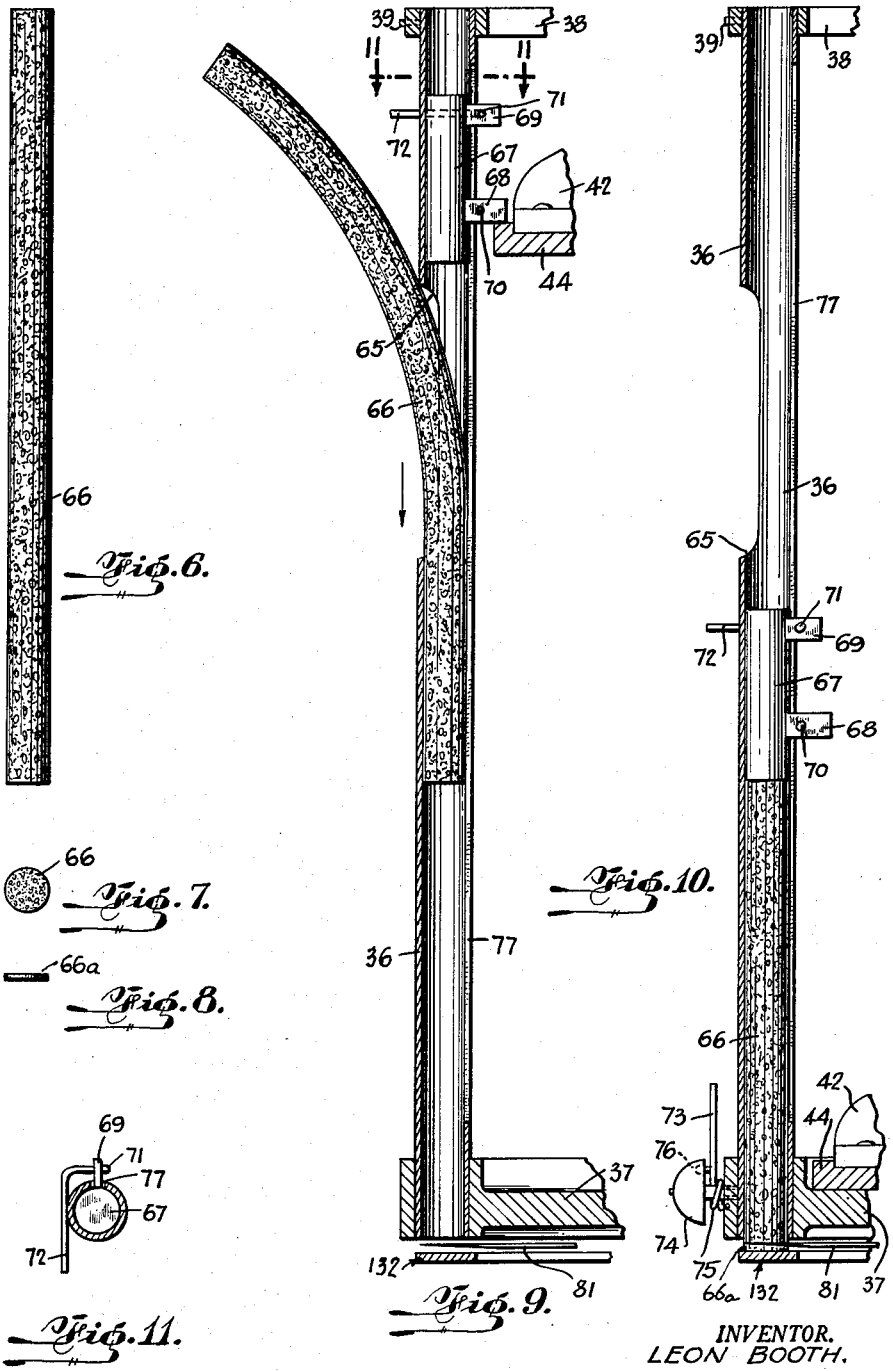

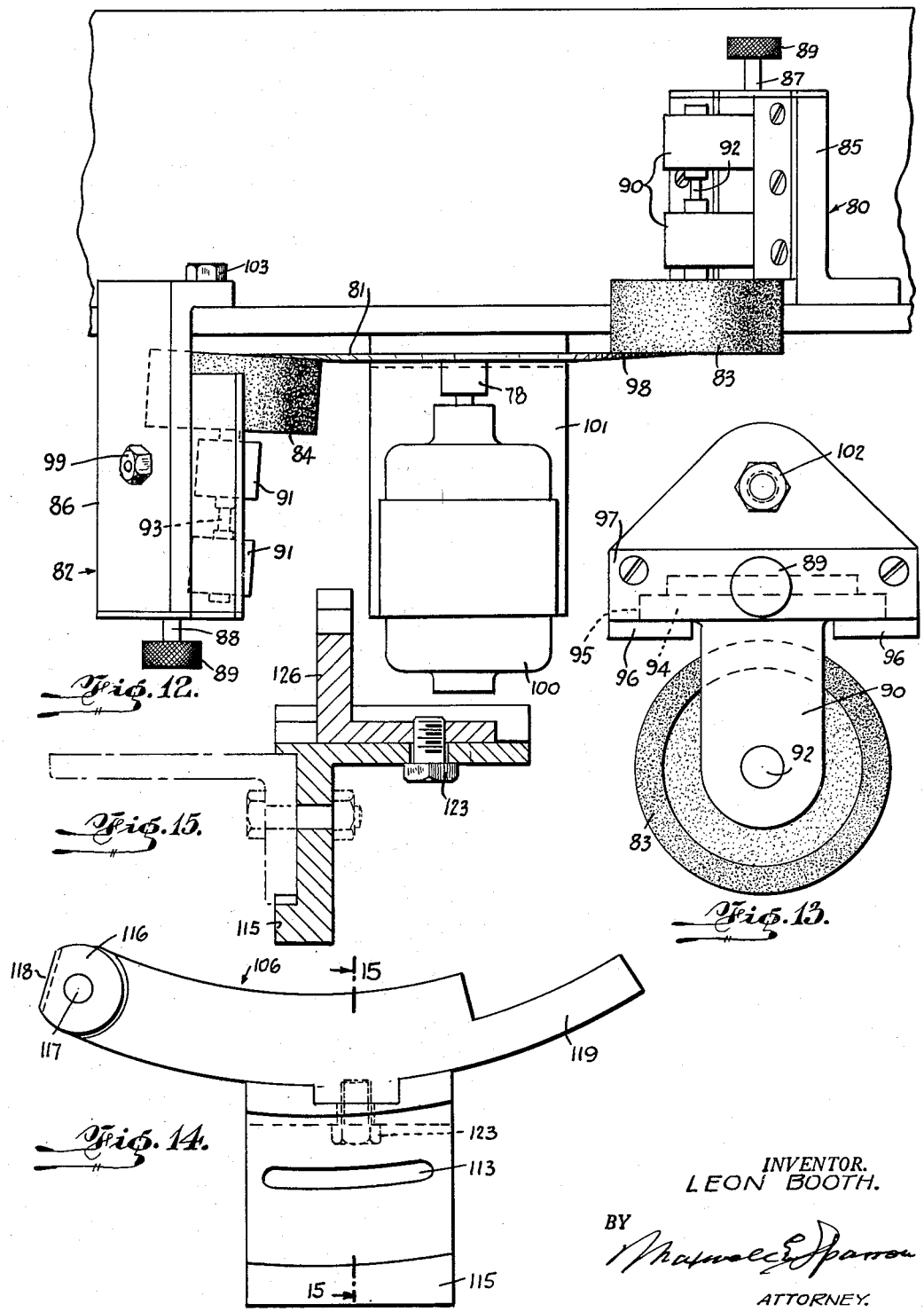

Patented Nov. 11, 1952

2,617,454

UNITED STATES PATENT OFFICE 2,617,454

ROD DISK CUTTING MACHINE

Leon Booth, New York, N. Y., assignor to Beacon Machine Works, New York, N. Y., a firm Application July 9, 1945, Serial No. 603,897

3 Claims. (Cl. 144—24)

1

This invention relates to machines for cutting disks of cork rods and similar materials.

It is an object of the present invention to provide a very practical, efficient, economical and relatively simple machine for cutting disks from cork rods and similar materials.

It is another object of the present invention to feed the cork rods by gravity towards a plurality of cutting knives, thus eliminating complicated feeding mechanism.

It is a still further object of this invention to provide a machine of the class described in which weights are added over the cork rods to facilitate the aforementioned gravity feed, and to provide means whereby the said weights may be simultaneously lifted for reloading with new cork rods.

Yet another object of this invention is to feed the cork rods to be sliced through slots in the sides of the machine.

A further object of this invention is to provide means for sharpening the cutting edges of the rotating knives and to provide means for adjusting the sharpening devices in relation to the worn cutting knives.

A further object of this invention is to provide a continuous track in sections for support of the cork rods to be sliced, portions of said track being vertically adjustable in accordance with the thickness of the cork disk desired and also being horizontally adjustable for the purpose of taking up any gaps created by the wearing down of the rotating knives.

It is a still further object of this invention to provide signal means whereby the attention of the attendant may be attracted to the machine as soon as the first rod in the set of rods has been completely sliced, thus permitting the raising of the weights and the insertion of a complete new set of cork rods into the machine.

Further objects and advantages of the invention will appear from the following disclosure thereof together with the attached drawings which illustrate a certain form of embodiment thereof. This form is shown for the purpose of illustrating the invention to give satisfactory and reliable results. It is to be understood that the instrumentalities of which the invention consists can be variously arranged and organized and that the invention is not limited to the precise arrangement and organization of the instrumentalities as herein shown and described.

In the drawings:

Fig. 1 is an elevational view partly in section of a disk slicing machine made in accordance with the invention;

2

Fig. 6 is a view of a typical cork rod to be sliced by the machine;

Fig. 7 is a plan view of one of the sliced disks;

Fig. 8 is an edge view of Fig. 7;

Fig. 9 is a view in section of one of the rod carrying tubes, the weights lifted, and the new rod in process of insertion;

Fig. 10 is a view similar to Fig. 9, showing the rod in cutting position;

Fig. 11 is a sectional view taken on lines 11—11 of Fig. 9;

Fig. 12 is a side view of a portion of the frame showing a rotating knife, its driving motor and the sharpening means all in relative position;

Fig. 13 is an enlarged top plan view of the sharpening means used on top of the rotating knife;

Fig. 14 is a detail plan view of one of the adjustable track members; and

Fig. 15 is a sectional view taken on line 15—15 of Fig. 14.

Figure 1:
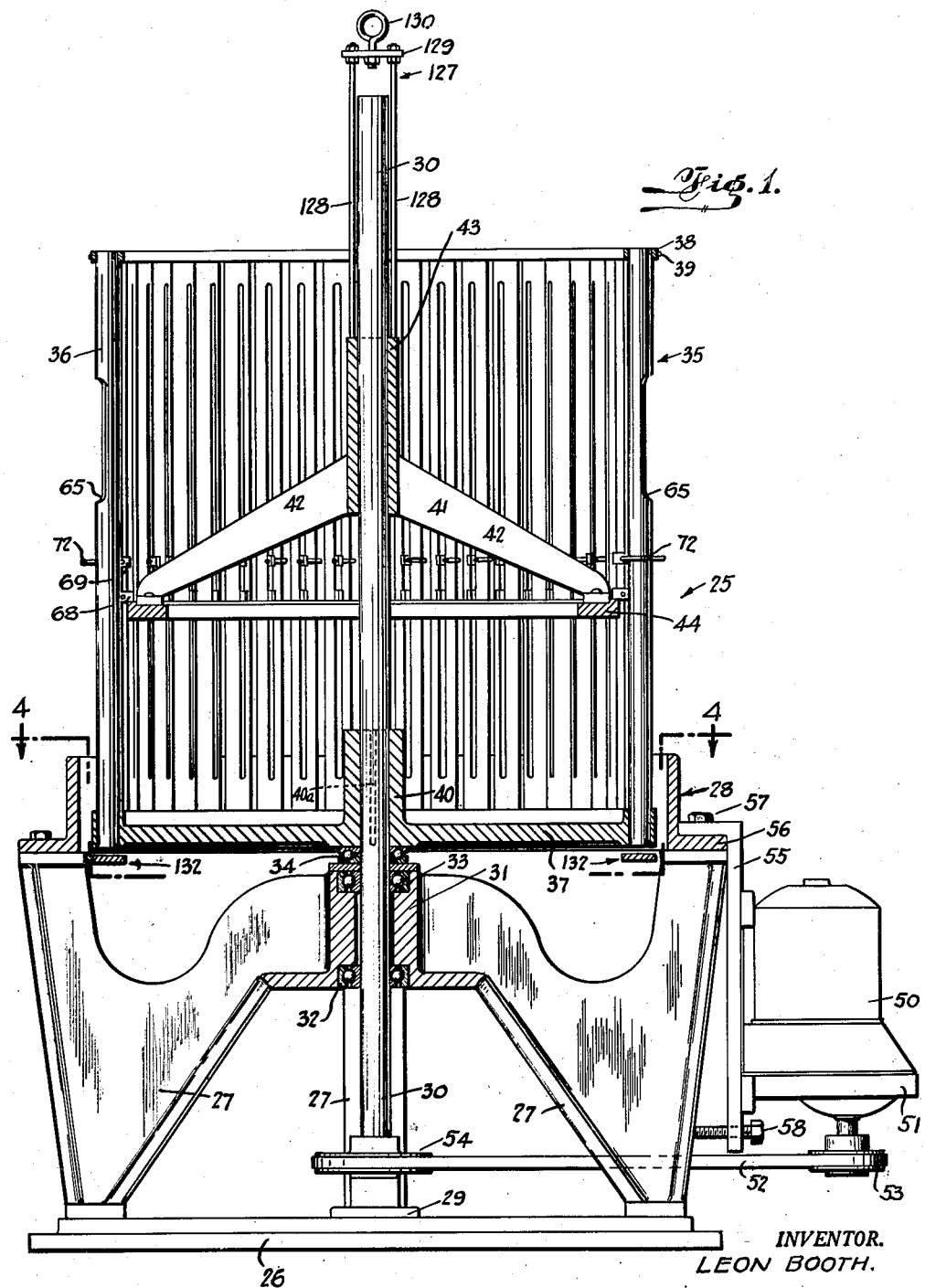

Referring now to the drawings, more in detail, there is disclosed a rod disk-cutting machine 25 comprising base plate 26, legs 27, circular frame 28 mounted on legs 27. Secured centrally to base plate 26 is a bearing 29 receiving the lower end of a shaft 30. Legs 27 at the point of junction form a bearing 31 which may be provided with anti-frictional bearings 32, 33. A thrust bearing 34 is provided on top of bearing 31 to accommodate the weight of the cage-like structure 35 formed by the vertically disposed spaced tubes 36, the lower supporting frame 37 and the upper supporting ring 38. Tubes 36 are preferably locked individually in the upper supporting ring by means of screws or bolts 39. The center of lower supporting frame 37 is provided with an elongated sleeve structure acting as a bearing 40. Shaft 30 passes through and rotates with bearing 40 upward and beyond the top of the opposite supporting ring 38. A spider or slide 41 comprising a plurality of legs 42 and a central bearing 43 is slidably mounted on shaft 30. Secured to legs 42 is a ring 44, the purpose of which will be described later on. A motor 50 having a reduction unit 51 drives shaft 30 by a chain or belt 52 and the pulleys 53, 54. Motor 50 is adjustably secured by a bracket 55 to the horizontal flange 56 of circular frame 28 by bolts 57. An adjusting bolt 58 may be provided to maintain the belt 52 under proper tension.

Referring to Figs. 9 and 10, tubes 36 are each provided with a cut-out or slot 65 to facilitate the insertion of the cork rod 66. This is clearly illustrated in Fig. 9. Ring 44 secured to spider legs 42, as shown in Fig. 9, is in its raised position, thus lifting the weights 67 clear of the slots 65 and permitting the insertion of a new supply of cork rods. After all rods 66 have been inserted in tubes 36, spider 41 with its ring 44 is again lowered into the position shown in Fig. 10, thus causing weights 67 to bear on top of each cork rod 66. Weights 67 are provided with two lugs 68, 69, the lower one of which is provided with a horizontal pin 70, while upper lug 69 is provided with a horizontal pin 71 having the extension 72. As the cage 35 rotates and as the weights 67 drop with the cutting away of the cork rods, the lowest of extensions 72 will hit against a bell lever 73, and because of the rotating movement of the cage 35, bell lever 73 will be caused to move away from bell 74 secured to frame 28, and after clearing bell lever 73, its spring 75 wil cause it to return to its original position, thus causing the bell hammer 76 to strike bell 74, giving a signal to an attendant that the supply of cork rods are running low. Tubes 36, in addition to slots 65, have each a slot 77 through which protrude weight lugs 68, 69, the horizontal pins 70 and 71 keeping the weight within the tube 36 while passing slot 65.

Figure 2:
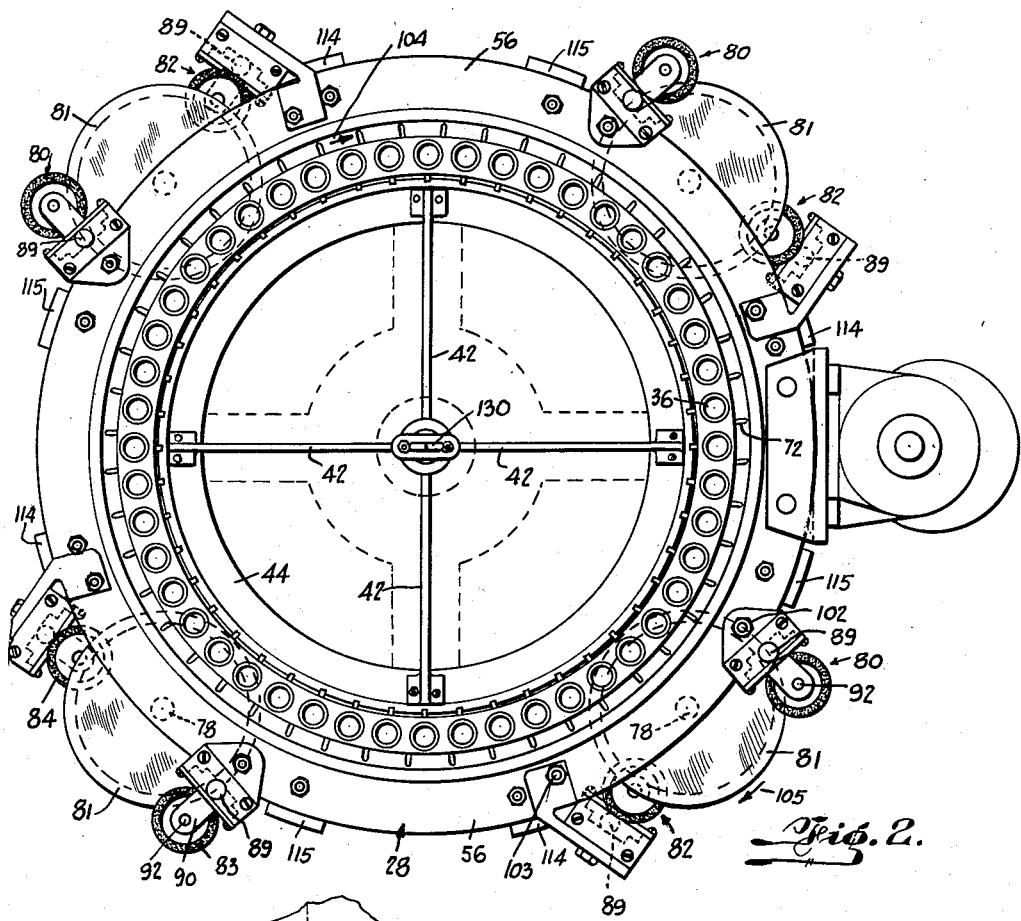
Fig. 2 is a top plan view of Fig. 1.
Figure 3:
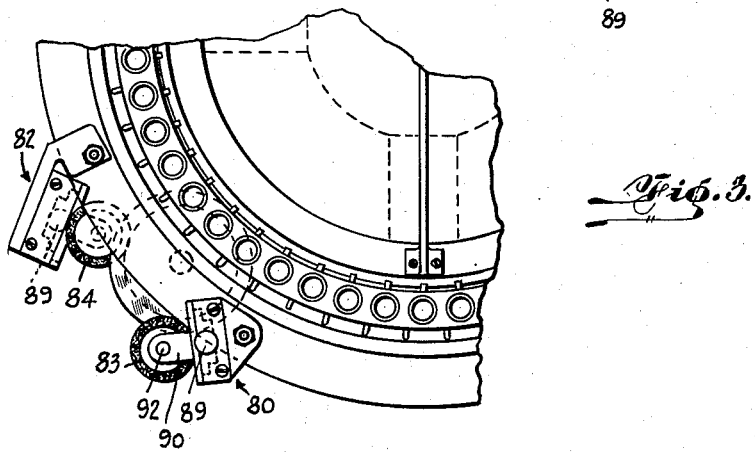
Fig. 3 is a fragmentary view of the lower left hand of Fig. 2, showing adjustments made to sharpening means to accommodate the worn down rotating knives.

Referring to Figs. 2 and 3, horizontal flange 56 of circular frame 28 has swingably mounted thereon an upper sharpener 80 and a lower sharpener 82 for each circular knife 81, the latter having a hub 78 connected to the shaft of motor 100. These sharpeners, as illustrated in Figs. 12 and 13, consist of the sharpening wheels 83, 84 slidably mounted on adjustable bearing blocks 85, 86. Vertical adjustments of the sharpening wheels 83, 84 within bearing blocks 85, 86 are made by means of screws 87, 88 having the knobs 89. Bearings 90, 91 for sharpening wheel shafts 92, 93 are secured to brackets 94 sliding within groove 95. Vertical plates 96 and horizontal plates 97 keep bracket 94 in place. It is the intention to keep upper sharpener 80 always in horizontal position, while lower sharpener 82 is adjusted to an angle conforming to the angularity 98 of the knife blade 81. This adjustment is made by means of an adjusting bolt 99. Each rotating knife 81 is preferably driven by a separate motor 100 mounted on a bracket 101. The constant sharpening of the edges of the rotating knives 81 will cause the said knives to gradually reduce their diameter, thus making it essential that the sharpeners be adjusted. This adjustment is made possible by mounting the sharpeners 80, 82 by bolts 102, 103 around which bearing blocks 85, 86 may be swung. The sharpening wheels 83, 84 are driven only by rotation of the power driven circular knives 81.

Figure 4:
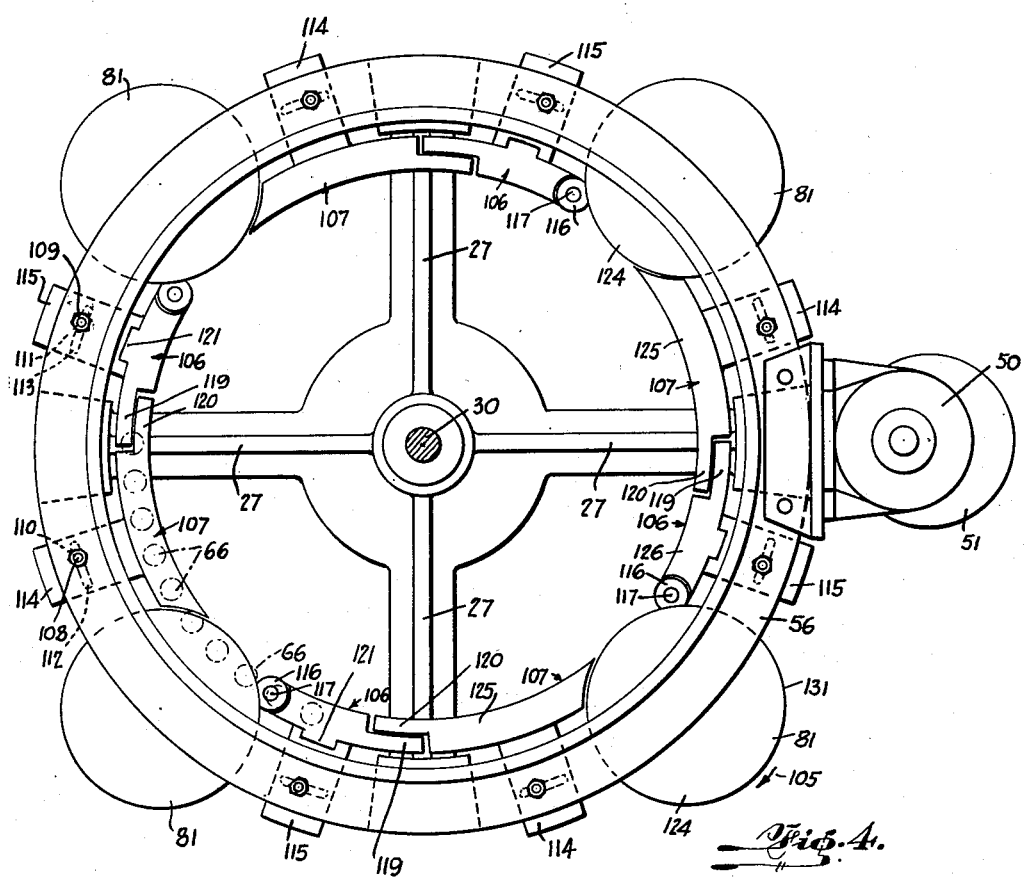
Fig. 4 is a sectional view taken on line 4—4 of Fig. 1 and showing the rod-supporting tracks in relation to the rotating knives.
Figure 5:
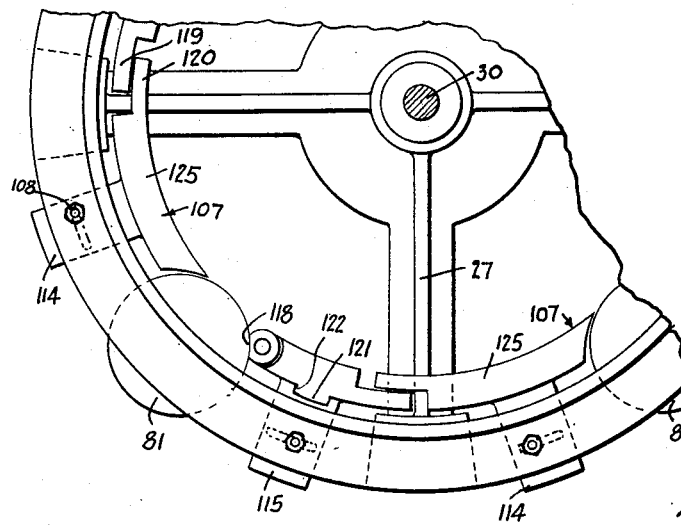
Fig. 5 is a fragmentary view of the lower left hand of Fig. 4 showing adjustments made to the said track with respect to worn down rotating knives.

Referring to Figs. 4 and 5, it is essential to support the cork rods 66 during their transition from one circular knife 81 to the other during movement of cage 35 in the direction of arrow 104 (Fig. 2). Power-driven knives 81 rotate in the direction of arrow 105. The track for supporting rods 66 during transition from one circular knife 81 to the next adjacent knife 81 consists of two parts, namely, segment 106 and complementary segment 107. Both segments are adjustably mounted on horizontal flange 56 by bolts 108, 109, respectively. Bolts 108, 109 pass through holes 110, 111 in flange 56, and through slots 112, 113 in flange members 114, 115 of segments 106, 107. Knives 81 cut cork rods 66 against an adjustable circular member 116 rotatably mounted on a pin 117 secured to segment 106. A flattened surface 118 is provided adjacent to the edge of knife 81. Segments 106, 107 are provided with overlapping portions 119, 120, respectively, thus providing a continuous track for the rods 66, even though segments 106, 107 may have been spread apart during adjustment for accommodating worn (and therefore smaller diametered) knives as shown in Fig. 5.

The surface of segment 107 always remains in the same plane as the top of knives 81. Therefore, the segment 107 can be adjusted only horizontally. Segment 106, however, is not only adjustable in a horizontal direction (as previously stated), but also in a vertical direction. This provision is made to adjust the desired thickness of the disks to be cut from the rod 66. This adjustment is taken care of by tongue 121 sliding in groove 122 of flange member 115, to which it is secured after adjustment by nut 123. It thus can be seen that the surface 124 of knife 81 and the surface 125 of segment member 107 form a continuous path for rods 66; surface 126 of segment 106 is slightly lower, the distance being equivalent to the thickness of the disk to be cut, while the remaining portion of the rod travels along the surface 124 of the knife and onto the surface 125 of the next adjacent segment 107.

The operation is as follows:

Spider 41 is raised by means of the lifting hook 127 comprising two rods 128, cross-member 129, and eye bolt 130. Rods 128 are secured to bearing 43. A hoist or other lifting device is engaged in the eye bolt 130 for the lifting of spider 41. Lifting spider 41 will cause ring 44 to engage weight lugs 68, thus raising weights 67 above openings of slots 65. Cork rods 66 are now inserted as seen in Fig. 9. After all of the tubes 36 have been filled with the rods 66, the spider 41 is again lowered into the position shown in Fig. 10, thus causing weights 67 to rest on rods 66. Cage rotating motor 50 and knife rotating motors 100 are started, causing the cage to rotate in the direction of arrow 104, and the knives to rotate in the direction of arrow 105, each rod resting on the track 132 formed by the surface 124 of a knife 81 and the surfaces 125 of segments 107, each rod then dropping slightly to surface 126 of segment 106, reaching cutting edge 131 of knife 81, thus causing disks 66a of desired thickness to be cut from the said rod. The rod then passes again over the surface 124 of the next knife 81, and from there onto the surface 125 of the next segment 107, thus continuing (repeating) the travel alternatingly over a knife 81 onto segment 107, then dropping down to the surface 126 of segment 106 and passing against the cutting edge 131 of knife 81. The uncut rod now passes again over the surface 124 of the knife 81 onto the surface 125 of the next segment 107, repeating the aforesaid operations until all of the rods have passed continuously all of the knives at which time a slice has been cut from each of the rods and until the rods have been completely sliced, after which, at the signal of bell 74, new rods 66 are inserted and the aforementioned operation is repeated.

A further purpose of the indicating means is to indicate when the shortest rod of the group of rods is about completely cut into disks. In other words, when the shortest rod has been cut to within about four disks from its top end, the signal would be sounded, thereby giving the operator notice to change the flow of disks from one receiving container to another container for inspection purposes, thus eliminating the requirement of inspection of all of the cut disks.

Having thus described my invention what is claim as new and desired to be secured by Letters Patent, is:

1. In a rod disk cutting machine the combination, with a plurality of angularly spaced circular cutting blades disposed in a single horizontal plane and a set of revolvable vertical tubes open at the bottom, said tubes serving as guide means for rods to be sliced into disks by said cutting blades, of supporting means disposed along an annular path for said tubes directly below the open bottom thereof, said supporting means comprising a plurality of arcuate segments each extending from one of said blades to another blade following next in the direction of movement of said tubes, each segment having a first portion adjacent and flush with said one blade and a second portion adjacent said other blade but depressed with respect thereto by a distance determined by the thickness of the disks to be cut.

2. In a rod disk cutting machine the combination according to claim 1 wherein each of said segments consists of a pair of relatively displaceable members extending toward respective ones of said blades.

3. In a rod disk cutting machine the combination according to claim 2 wherein said members are provided with horizontally overlapping extensions each registering with part of the open bottom of said tubes.

LEON BOOTH.

REFERENCES CITED

The following references are of record in the file of this patent:

UNITED STATES PATENTS

| Number | Name | Date |
| --- | --- | --- |
| 512,782 | Wickey | Jan. 16, 1894 |
| 920,010 | Bogdanffy | Apr. 27, 1909 |
| 1,176,136 | Demuth | Mar. 21, 1916 |
| 1,320,010 | Kennedy | Oct. 28, 1919 |
| 1,642,081 | Munroe | Sept. 13, 1927 |
| 2,193,979 | Ott | Mar. 19, 1940 |
| 2,196,288 | Binder | Apr. 9, 1940 |
| 2,274,230 | Bechler | Feb. 24, 1942 |
| 2,328,712 | Domke | Sept. 7, 1943 |